US011184651B1

(12) United States Patent
Muscara et al.

(10) Patent No.: US 11,184,651 B1
(45) Date of Patent: *Nov. 23, 2021

(54) DYNAMIC TRANSPORT STREAM MONITORING DEVICE

(71) Applicant: CSC Holdings, LLC, Bethpage, NY (US)

(72) Inventors: Jamie Muscara, Massapequa, NY (US); Louis Maniscalco, Island Park, NY (US); Igor Astakhov, Hicksville, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,330

(22) Filed: Feb. 14, 2020

Related U.S. Application Data

(63) Continuation of application No. 15/380,288, filed on Dec. 15, 2016, now Pat. No. 10,575,034.

(51) Int. Cl.
*H04N 21/61* (2011.01)
*H04N 21/234* (2011.01)
*H04N 21/23* (2011.01)
*H04N 21/643* (2011.01)
*H04N 21/436* (2011.01)
(Continued)

(52) U.S. Cl.
CPC ....... *H04N 21/23605* (2013.01); *H04L 69/22* (2013.01); *H04N 21/2225* (2013.01); *H04N 21/234* (2013.01); *H04N 21/2343* (2013.01); *H04N 21/2407* (2013.01); *H04N 21/2662* (2013.01); *H04N 21/4622* (2013.01); *H04N 21/6118* (2013.01); *H04N 21/643* (2013.01); *H04N 21/6405* (2013.01);
(Continued)

(58) Field of Classification Search
CPC ......... H04N 21/23605; H04N 21/6118; H04N 21/2343; H04N 21/643; H04N 21/2662; H04N 21/2407; H04N 21/4622; H04N 21/2225; H04N 21/234; H04N 21/6405; H04N 21/23608; H04N 21/64322; H04N 21/25833; H04L 69/22
See application file for complete search history.

(56) References Cited

U.S. PATENT DOCUMENTS 7,024,681 B1 * 4/2006 Fransman .......... H04N 7/17327
348/E5.008
10,575,034 B1 2/2020 Muscara et al.
(Continued)

*Primary Examiner* — Mulugeta Mengesha
*Assistant Examiner* — Alazar Tilahun
(74) *Attorney, Agent, or Firm* — Sterne, Kessler, Goldstein & Fox P.L.L.C.

(57) ABSTRACT

The present disclosure describes a monitoring device for determining one or more characteristics of one or more scheduled programs within one or more packetized elementary streams of one or more transport streams. The monitoring device receives the one or more transport streams from a service provider system and de-encapsulates the one or more packetized elementary streams from the one or more transport streams. The monitoring device determines the one or more characteristics of the one or more scheduled programs from the one or more packetized elementary streams. The one or more characteristics can be used by the monitoring device to adapt on a dynamic, real-time, or near real-time, basis to changes to the one or more transport streams.

19 Claims, 3 Drawing Sheets

(51) Int. Cl.
 *H04N 21/238* (2011.01)
 *H04N 21/236* (2011.01)
 *H04N 21/6405* (2011.01)
 *H04N 21/24* (2011.01)
 *H04N 21/258* (2011.01)
 *H04N 21/2225* (2011.01)
 *H04N 21/2343* (2011.01)
 *H04N 21/2662* (2011.01)
 *H04L 29/06* (2006.01)
 *H04N 21/462* (2011.01)

(52) U.S. Cl.
 CPC . *H04N 21/23608* (2013.01); *H04N 21/25833* (2013.01); *H04N 21/64322* (2013.01)

(56) References Cited

U.S. PATENT DOCUMENTS

| | | |
|---|---|---|
| 2008/0056123 A1 | 3/2008 | Howard et al. |
| 2010/0017839 A1 | 1/2010 | Song et al. |
| 2012/0042092 A1 | 2/2012 | Hong et al. |
| 2016/0044532 A1* | 2/2016 | Champel ............... H04L 65/607 370/329 |
| 2016/0127779 A1 | 5/2016 | Elstermann et al. |
| 2016/0353177 A1 | 12/2016 | Gordon et al. |
| 2016/0380647 A1 | 12/2016 | Bansal et al. |

* cited by examiner

DYNAMIC TRANSPORT STREAM MONITORING DEVICE

CROSS-REFERENCE TO RELATED APPLICATIONS

The present application is a continuation of U.S. patent application Ser. No. 15/380,288, filed Dec. 15, 2016, now U.S. Pat. No. 10,575,034, which is incorporated herein by reference in its entirety.

BACKGROUND

Service providers of a service schedule programs relating to the service and provide these programs to subscriber devices using transport streams. The transport streams include multiple packetized elementary streams with each program being communicated using one or more of these packetized elementary streams. The subscriber devices need to be configured and synchronized to these packetized elementary streams to access the scheduled programs.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

Overview

The present disclosure describes a monitoring device for determining one or more characteristics of one or more scheduled programs within one or more packetized elementary streams of one or more transport streams. The monitoring device receives the one or more transport streams from a service provider system and de-encapsulates the one or more packetized elementary streams from the one or more transport streams. The monitoring device determines the one or more characteristics of the one or more scheduled programs from the one or more packetized elementary streams. The one or more characteristics can be used by the monitoring device to adapt on a dynamic, real-time, or near real-time, basis to changes to the one or more transport streams.

Exemplary Point-To-Multipoint Communication System

Figure 1:
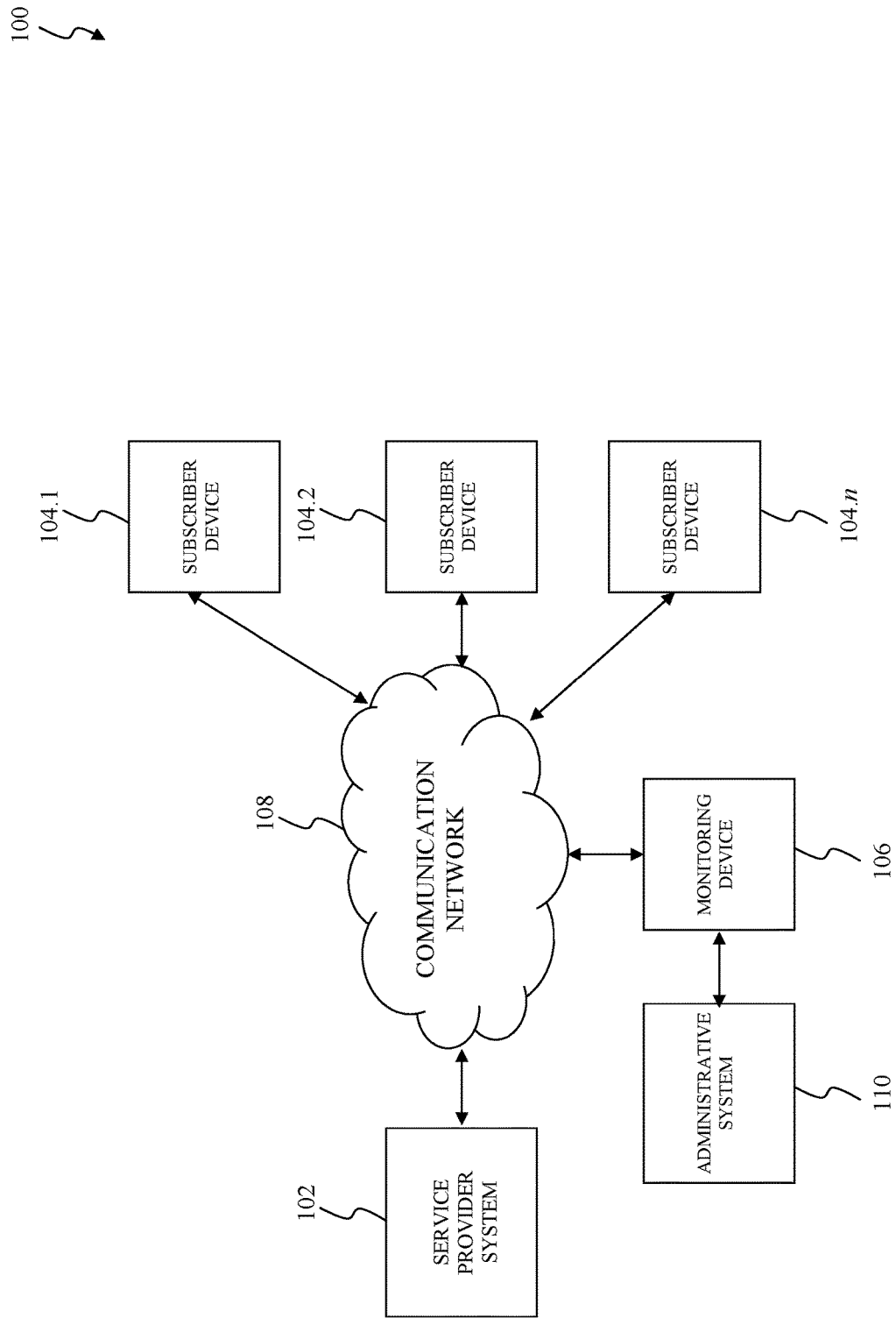
FIG. 1 illustrates a block diagram of an exemplary point-to-multipoint communication system according to an embodiment of the present disclosure.

FIG. 1 illustrates a block diagram of an exemplary point-to-multipoint communication system according to an embodiment of the present disclosure. A point-to-multipoint communication system 100 includes a service provider system 102 to provide a service, such as bi-directional communication of video, audio, and/or data to provide some examples, to subscriber devices 104.1 through 104.n. The subscriber devices 104.1 through 104.n represent one or more personal computers, data terminal equipment, one or more telephony devices, such as one or more mobile phones or one or more mobile computing devices to provide some examples, one or more broadband media players, one or more network controlled appliances, one or more set-top boxes, and/or other devices that are capable of transmitting and/or receiving video, audio, and/or data that will be apparent to those skilled in the relevant art(s). As used herein, the term "downstream direction" refers to the transfer of information in a first direction from the service provider system 102 to the subscriber devices 104.1 through 104.n. The term "upstream direction" refers to the transfer of information in a second direction from the subscriber devices 104.1 through 104.n to the service provider system 102.

The service provider system 102 manages the upstream direction and the downstream direction transfer of information to and/or from the subscriber devices 104.1 through 104.n. This transfer of information can use any suitable wireless communication and/or wired communication that will be apparent to those skilled in the relevant art(s) without departing from the spirit and scope of the present disclosure. As illustrated in FIG. 1, the service provider system 102 provides one or more scheduled programs in the downstream direction to the subscriber devices 104.1 through 104.n. The one or more scheduled programs can include audio data, video data, such as a television program or movie to provide some examples, and/or digital data, such as one or more webpages of a website, an electronic programing guide, a software application, to provide some examples. In an exemplary embodiment, the one or more scheduled programs can be formatted into one or more transport streams, such as one or more Moving Picture Experts Group (MPEG) transport streams to provide an example, for delivery to the subscriber devices 104.1 through 104.n. In this exemplary embodiment, the one or more transport streams represent encapsulations of one or more packetized elementary streams having audio data, video data and/or digital data. Additionally, in this exemplary embodiment, each of the one or more scheduled programs can be represented by one or more corresponding packetized elementary streams from among the one or more packetized elementary streams within the one or more transport streams. The one or more transport streams can include one or more single program transport streams including a single program and/or one or more multiple program transport streams including multiple programs.

The monitoring device 106 monitors the one or more transport streams and catalogs one or more characteristics of the one or more scheduled programs within the one or more transport streams. However, in some situations, the monitoring device 106 can query the subscriber devices 104.1 through 104.n for the one or more characteristics of the one or more scheduled programs within the one or more transport streams. For example, the monitoring device 106 can query the subscriber devices 104.1 through 104.n when the one or more transport streams may be unavailable, for example, unexpected changes occurring to the one or more transport stream. Although the monitoring device 106 is illustrated as being coupled to the service provider system 102 via the communication network 108, this is for illustrative purposes only. Those skilled in the relevant art(s) will recognize that the monitoring device 106 can be implemented within or directly coupled to the service provider system 102 without departing from the spirit and scope of the present disclosure. The monitoring and/or cataloging of the one or more transport streams by the monitoring device 106 allows for the monitoring device 106 to adapt on a dynamic, real-time, or near real-time, basis to changes to the one or more transport streams.

In an exemplary embodiment, the one or more characteristics of the one or more transport streams can include an am_source_ip, an am_group, an mm_id, an mm_am_id, an mm_program, an mm_pid_es, an mm_description, an mm_pid_pcr, an mm_pid_pmt, an mm_port_in, and/or an mm_port_out to provide some examples corresponding each of the one or more scheduled programs. The am_source_ip represents a source Internet Protocol (IP) address of the service provider system 102 which provided the one or more transport streams. The am_group represents a multicast IP address of the one or more transport streams. The mm_id represents a unique value associated with the am_source_ip and the am_group. The mm_am_id represents one or more identifiers corresponding the one or more transport streams. The mm_program represents an identifier for each of the one or more scheduled programs. The mm_pid_es represents an identifier for each of the one or more packetized elementary streams within the one or more transport streams. The mm_description represents one or more optional comments or notes that can be included within the one or more packetized elementary streams. The mm_pid_pcr represents a program clock reference. The mm_pid_pmt represents a Program Map Table (PMTs) indicating associations between the one or more scheduled programs and one or more corresponding packetized elementary streams within the one or more transport streams. The mm_port_in indicates one or more input ports of the service provider system 102 that received the one or more scheduled programs. The mm_port_out indicates one or more output ports of the service provider system 102 that provided the one or more transport streams.

The subscriber devices 104.1 through 104.n access one or more desired programs from one or more corresponding packetized elementary streams within the one or more transport streams. In some situations, the administrative system 110 query the monitoring device 106 for the one or more characteristics of the one or more scheduled programs within the one or more transport streams. In some situations, the one or more characteristics can also be used to troubleshoot problems within the point-to-multipoint communication system 100. For example, the monitoring device 106 and/or the administrative system 110 can notify the service provider system 102 to changes in the one or more characteristics. In response to the notification, the service provider system 102 can determine whether these changes are expected, such as a planned change in the one or more scheduled programs, or unexpected. If these changes are determined to be unexpected, the service provider system 102 can evaluate the point-to-multipoint communication system 100 to determine the cause of these changes.

The communication network 108 communicatively couples the service provider system 102, the subscriber devices 104.1 through 104.n, and the monitoring device 106. In an exemplary embodiment, the communication network 108 includes multiple signal pathways, such as a primary signal pathway and a backup signal pathway to provide some examples, for communicating the one or more transport streams to the subscriber devices 104.1 through 104.n. In this exemplary embodiment, the monitoring device 106 can utilize the one or more characteristics of the one or more scheduled programs within the one or more transport streams to determine whether the primary signal pathway or the backup signal pathway is being used to transport the one or more transport streams in the event, whether expected or unexpected, that the signal pathway changes between the primary signal pathway and the backup signal pathway.

Exemplary Monitoring Device of the Point-To-Multipoint Communication System

Figure 2:
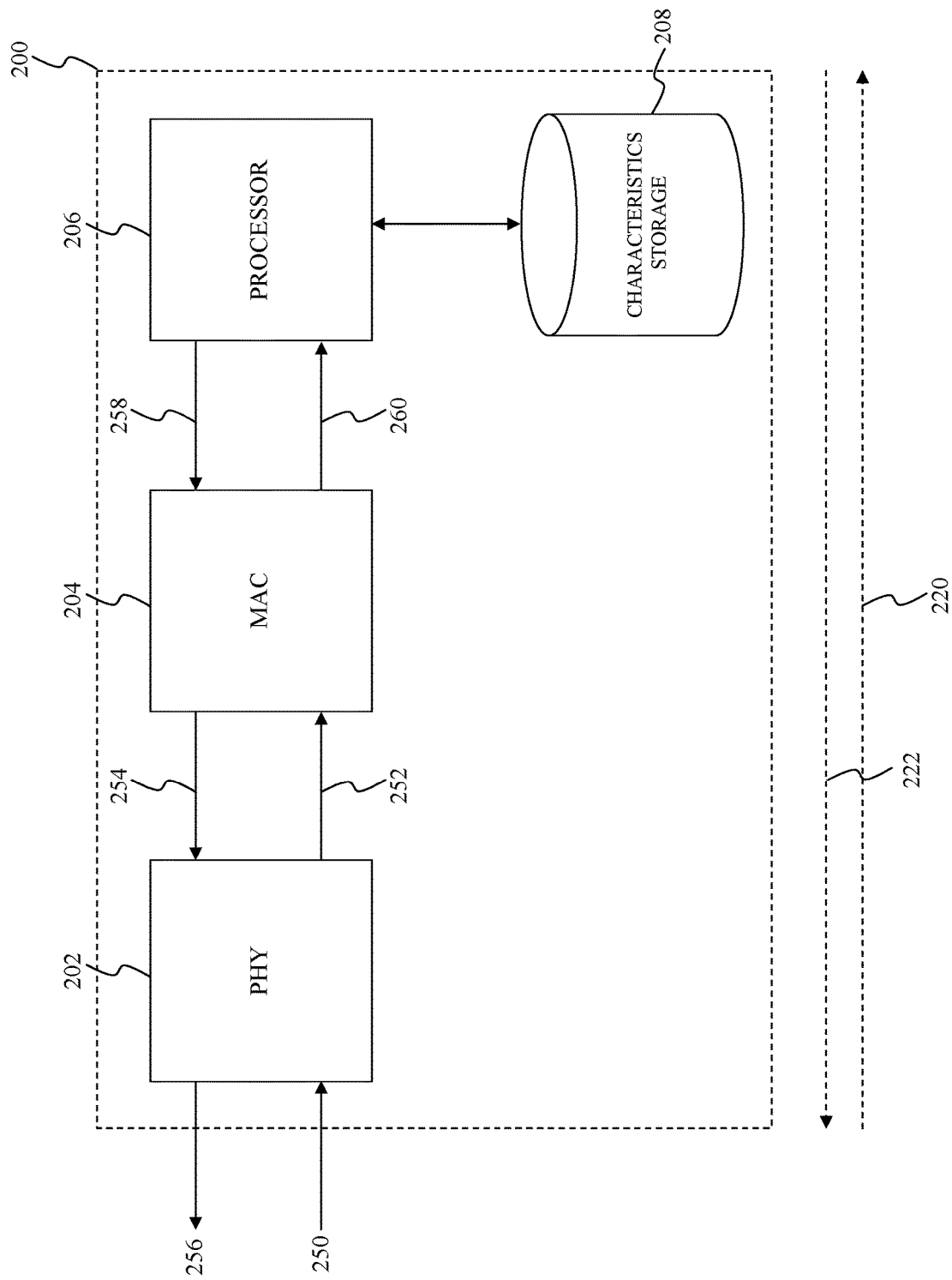
FIG. 2 illustrates a block diagram of a monitor system of the exemplary point-to-multipoint communication system according to an embodiment of the present disclosure.

FIG. 2 illustrates a block diagram of a monitoring device of the exemplary point-to-multipoint communication system according to an embodiment of the present disclosure. A monitoring device 200 monitors one or more transport streams provided by a service provider system, such as the service provider system 102 to provide an example, and catalogs one or more characteristics of one or more scheduled programs within the one or more transport streams. The monitoring and/or cataloging of the one or more transport streams by the monitoring device 200 allows the monitoring device 200 to adapt on a dynamic, real-time, or near real-time, basis to changes to the one or more transport streams. The monitoring device 200 includes physical layer (PHY) circuitry 202, media access controller (MAC) circuitry 204, processor circuitry 206, and characteristics storage 208.

The PHY circuitry 202 represents an interface between a communication network, such as the communication network 108 to provide an example, and the MAC circuitry 204. Generally, the PHY circuitry 202 demodulates, decodes, and/or converts an information signal 250 received over the transmission medium to provide an information frame 252 in a downlink direction 220. The information signal 250 can include the one or more transport streams provided by the service provider system and/or one or more queries for the one or more characteristics of one or more scheduled programs within the one or more transport streams provided by the service provider system and/or the one or more of the subscriber devices. Additionally, the PHY circuitry 202 modulates, encodes, and/or converts an information frame 254 to provide an information signal 256 for transmission to the communication network in an uplink direction 222. The information frame 254 can include the one or more characteristics of one or more scheduled programs within the one or more transport streams.

The MAC circuitry 204 represents an interface between the PHY circuitry 202 and the processor circuitry 206. The MAC circuitry 204 manages and maintains communication of the monitoring device 200 by coordinating access to the transmission medium and formatting communication in accordance with one or more communication standards or protocols, such as one or more versions of the Moving Picture Experts Group (MPEG) communication standard or protocol to provide an example, that are supported by the monitoring device 200. In the uplink direction 222, the MAC circuitry 204 encapsulates or frames a sequence of bits 258 to provide a payload portion of the information frame 254 and appends a preamble portion of the information frame 254 to the payload portion in accordance with the one or more communication standards or protocols to the provide the information frame 254. Otherwise, the MAC circuitry 204 de-encapsulates or de-frames the information frame 252 in accordance with the one or more communication standards or protocols to provide a payload portion of the information frame 252 as sequence of bits 260 in the downlink direction 220. For example, the information frame 252 can include the one or more transport streams, each of the one or more transport streams being demodulated, decoded, and/or converted by the PHY circuitry 202. In this example, the MAC circuitry 204 de-encapsulates or de-frames one or more packetized elementary streams within the one or more transport streams to provide the one or more packetized elementary streams to the processor circuitry 206 as the sequence of bits 260.

The processor circuitry 206 controls overall operation and/or configuration of the monitoring device 200. For example, as described above, the sequence of bits 260 can include the one or more packetized elementary streams within the one or more transport streams. In this example, the processor circuitry 206 can determine the one or more characteristics of the one or more scheduled programs within the one or more packetized elementary streams. This determination can be made by examining one or more header fields of the one or more packetized elementary streams. As discussed above in FIG. 1, these characteristics can include the am_source_ip, the am_group, the mm_id, the mm_am_id, the mm_program, the mm_pid_es, the mm_description, the mm_pid_pcr, the mm_pid_pmt, the mm_port_in, and/or the mm_port_out to provide some examples corresponding each of the one or more scheduled programs. In an exemplary embodiment, the one or more characteristics of the one or more scheduled programs are stored as one or more entries in one or more tables, one or more listings, and/or one or more databases in the characteristics storage 208. In this exemplary embodiment, the processor circuitry 206 generates mm_ids corresponding to the one or more scheduled programs and reads from and/or writes to the one or more entries corresponding to the one or more scheduled programs using the mm_ids as one or more indexes to the one or more tables, the one or more listings, and/or the one or more databases. Several examples of these characteristics are illustrated in the table below:

| EXAMPLE 1 | |
|---|---|
| am_source_ip | 10.200.34.70 |
| am_group | 232.5.251.4 |
| mm_id | 5386 |
| mm_am_id | 29 |
| mm_program | 1 |
| mm_pid_es | 1001, 1002, 1003, 1002, 1003 |
| mm_description | {null} MTVTR3 |
| mm_pid_pcr | 1001 |
| mm_pid_pmt | 1000 |
| mm_port_in | 49410 |
| mm_port_out | 49410 |

| EXAMPLE 2 | |
|---|---|
| am_source_ip | 10.252.32.157 |
| am_group | 239.5.251.9 |
| mm_id | 2964 |
| mm_am_id | 2728 |
| mm_program | 114 |
| mm_pid_es | |
| mm_description | |
| mm_pid_pcr | 2143 |
| mm_pid_pmt | 2140 |
| mm_port_in | 10000 |
| mm_port_out | 10000 |

| EXAMPLE 3 | |
|---|---|
| am_source_ip | 10.200.225.186 |
| am_group | 239.6.251.7 |
| mm_id | 3440 |
| mm_am_id | 3082 |
| mm_program | 34 |
| mm_pid_es | 1342, 1343 |
| mm_description | {null} Centric |
| mm_pid_pcr | 1342 |
| mm_pid_pmt | 1340 |
| mm_port_in | 1012 |
| mm_port_out | 1012 |

| EXAMPLE 4 | |
|---|---|
| am_source_ip | 10.200.226.22 |
| am_group | 239.6.251.12 |
| mm_id | 5022 |
| mm_am_id | 4313 |
| mm_program | 9 |
| mm_pid_es | 2336, 2337 |
| mm_description | {null} EWTN SD |
| mm_pid_pcr | 2336 |
| mm_pid_pmt | 2345 |
| mm_port_in | 1014 |
| mm_port_out | 1014 |

As another example, the processor circuitry 206 can compare the one or more characteristics with one or more characteristics previously stored in the characteristics storage 208. In this other example, the processor circuitry 206 can send a notification to changes in the one or more characteristics as discussed in FIG. 1.

As a further example, the sequence of bits 260 can include the one or more queries for the one or more characteristics of the one or more scheduled programs within the one or more transport streams provided by the service provider system. In this example, the processor circuitry 206 can query the characteristics storage 208 for one or more of the one or more characteristics and provide these characteristics as the sequence of bits 258 for transmission in the uplink direction 222.

The characteristics storage 208 stores the one or more characteristics of the one or more scheduled programs. The characteristics storage 208 can include non-transitory machine-readable mediums such as read only memory (ROM), random access memory (RAM), magnetic disk storage media, optical storage media, and/or flash memory devices to provide some examples.

Figure 3:
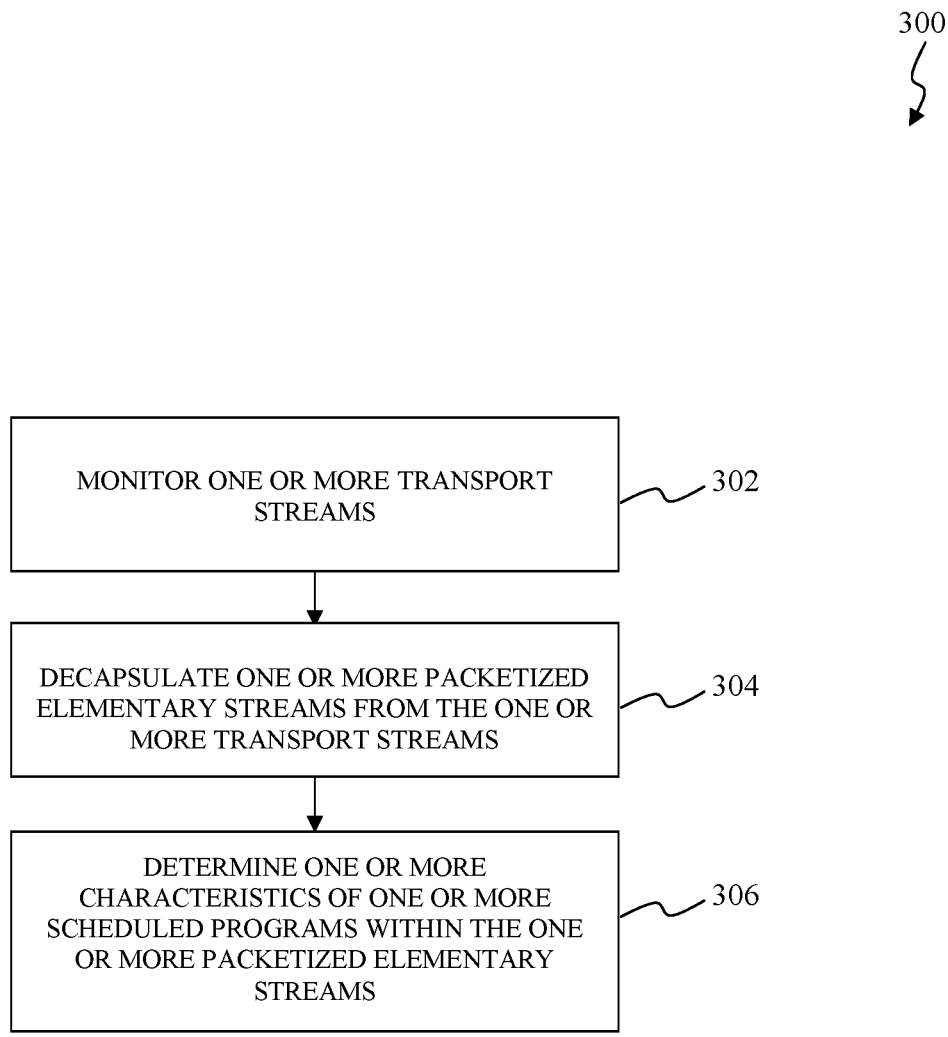
FIG. 3 is a flowchart of exemplary operational steps in monitoring of the exemplary point-to-multipoint communication system according to an embodiment of the present disclosure.

Exemplary Method to Determine One or More Characteristics of One or More Scheduled Programs within the One or More Packetized Elementary Streams FIG. 3 is a flowchart of exemplary operational steps in monitoring of the exemplary point-to-multipoint communication system according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of a service provider system, such as the monitoring device 200 to provide an example, in optimizing the delivery of one or more advertising messages of the advertising campaign.

At step 302, the operational control flow 300 monitors one or more transport streams. For example, a monitoring device, such as the monitoring device 106 and/or the monitoring device 200 to provide some examples, can receive the one or more transport streams from a service provider system, such as the service provider system 102 to provide an example.

At step 304, the operational control flow 300 de-encapsulates one or more packetized elementary streams from the one or more transport streams of step 302. The operational control flow 300 can de-encapsulate the one or more packetized elementary streams from the one or more transport streams of step 302 in accordance with one or more communication standards or protocols, such as one or more versions of the Moving Picture Experts Group (MPEG) to provide an example.

At step 306, the operational control flow 300 determines one or more characteristics of one or more scheduled programs within the one or more packetized elementary streams of step 304. The operational control flow 300 can examine one or more header fields of the one or more packetized elementary streams to determine the one or more characteristics. As discussed above in FIG. 1, these characteristics can include the am_source_ip, the am_group, the mm_id, the mm_am_id, the mm_program, the mm_pid_es, the mm_description, the mm_pid_pcr, the mm_pid_pmt, the mm_port_in, and/or the mm_port_out to provide some examples corresponding each of the one or more scheduled programs within the one or more packetized elementary streams of step 304.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A monitoring device within a point-to-multipoint communication system, the monitoring device comprising:
    physical layer (PHY) circuitry configured to receive a first transport stream from a service provider system within the point-to-multipoint communication system;
    media access controller (MAC) circuitry configured to retrieve a first scheduled program from the first transport stream;
    a storage configured to store a first plurality of characteristics of the first scheduled program; and
    processor circuitry configured to:
        determine a second plurality of characteristics of the first scheduled program,
        compare a first characteristic from among the first plurality of characteristics with a corresponding second characteristic from among the second plurality of characteristics, and
        notify the service provider system of a change between the first characteristic and the corresponding second characteristic.

2. The monitoring device of claim 1, wherein the MAC circuitry is further configured to de-encapsulate a packetized elementary stream within the first transport stream, the packetized elementary stream corresponding to the first scheduled program.

3. The monitoring device of claim 1, wherein the first transport stream is from among a plurality of transport streams,
wherein a second transport stream, having a second program, from among the plurality of transport streams is unavailable,
wherein the storage is further configured to store a third plurality of characteristics of the second scheduled program, and
wherein the processor circuitry is further configured to:
query a subscriber device within the point-to-multipoint communication system for a fourth plurality of characteristics of the second scheduled program,
compare a third characteristic from among the third plurality of characteristics with a corresponding fourth characteristic from among the fourth plurality of characteristics, and
notify the service provider system of a change between the third characteristic and the corresponding fourth characteristic.

4. The monitoring device of claim 1, wherein the first plurality of characteristics comprises:
an am_source_ip, an am_group, an mm_id, an mm_a-m_id, an mm_program, an mm_pid_es, an mm_description, an mm_pid_pcr, an mm_pid_pmt, an mm_port_in, or an mm_port_out corresponding to the first scheduled program.

5. The monitoring device of claim 1, wherein the storage is configured to store the first plurality of characteristics as a table, a listing, or a database.

6. The monitoring device of claim 1, wherein the processor circuitry is configured to examine a header associated with the first scheduled program to determine the first plurality of characteristics.

7. A monitoring device within a point-to-multipoint communication system, the monitoring device comprising:
physical layer (PHY) circuitry configured to attempt to receive a transport stream from a service provider system within the point-to-multipoint communication system;
a storage configured to store a first plurality of characteristics of a plurality of scheduled programs within the transport stream; and
processor circuitry configured to:
query a subscriber device within the point-to-multipoint communication system for a second plurality of characteristics of the plurality of scheduled programs,
compare a first characteristic from among the first plurality of characteristics with a corresponding second characteristic from among the second plurality of characteristics, and
notify the service provider system of a change between the first characteristic and the corresponding second characteristic.

8. The monitoring device of claim 7, wherein the first plurality of characteristics comprises:
an am_source_ip, an am_group, an mm_id, an mm_a-m_id, an mm_program, an mm_pid_es, an mm_description, an mm_pid_pcr, an mm_pid_pmt, an mm_port_in, or an mm_port_out corresponding to each of the plurality of scheduled programs.

9. The monitoring device of claim 7, wherein the storage is configured to store the first plurality of characteristics as a table, a listing, or a database.

10. The monitoring device of claim 7, wherein the processor circuitry is configured to examine a plurality of headers associated with the plurality of scheduled programs to determine the first plurality of characteristics.

11. The monitoring device of claim 7, wherein the change between the first characteristic and the corresponding second characteristic causes the transport stream to be unavailable.

12. The monitoring device of claim 7, wherein the PHY circuitry is further configured to receive the second plurality of characteristics from the subscriber device.

13. A monitoring device within a point-to-multipoint communication system, the monitoring device comprising:
a storage configured to store a first plurality of characteristics of a plurality of scheduled programs within a transport stream; and
processor circuitry configured to:
query a subscriber device within the point-to-multipoint communication system for a second plurality of characteristics of the plurality of scheduled programs,
compare a first characteristic from among the first plurality of characteristics with a corresponding second characteristic from among the second plurality of characteristics, and
notify the service provider system of a change between the first characteristic and the corresponding second characteristic.

14. The monitoring device of claim 13, wherein the first plurality of characteristics comprises:
an am_source_ip, an am_group, an mm_id, an mm_a-m_id, an mm_program, an mm_pid_es, an mm_description, an mm_pid_pcr, an mm_pid_pmt, an mm_port_in, or an mm_port_out corresponding to each of the plurality of scheduled programs.

15. The monitoring device of claim 13, wherein the storage is configured to store the first plurality of characteristics as a table, a listing, or a database.

16. The monitoring device of claim 13, wherein the processor circuitry is configured to examine a plurality of headers associated with the plurality of scheduled programs to determine the first plurality of characteristics.

17. The monitoring device of claim 13, wherein the change between the first characteristic and the corresponding second characteristic causes the transport stream to be unavailable.

18. The monitoring device of claim 13, further comprising:
physical layer (PHY) circuitry configured to receive the second plurality of characteristics from the subscriber device.

19. The monitoring device of claim 13, wherein the PHY circuitry configured to receive the second plurality of characteristics from the subscriber device over a communication network coupled to a service provider system within the point-to-multipoint communication system.

* * * * *